United States Patent
Morishita et al.

(10) Patent No.: US 10,857,987 B2
(45) Date of Patent: Dec. 8, 2020

(54) BRAKING CONTROL DEVICE FOR VEHICLE

(71) Applicant: ADVICS CO., LTD., Kariya-shi (JP)

(72) Inventors: Kazuya Morishita, Obu (JP); Takanori Iida, Nagoya (JP)

(73) Assignee: ADVICS CO., LTD., Kariya-shi (JP)

( * ) Notice: Subject to any disclaimer, the term of this patent is extended or adjusted under 35 U.S.C. 154(b) by 0 days.

(21) Appl. No.: 16/487,002

(22) PCT Filed: Mar. 29, 2018

(86) PCT No.: PCT/JP2018/013389
§ 371 (c)(1),
(2) Date: Aug. 19, 2019

(87) PCT Pub. No.: WO2018/181787
PCT Pub. Date: Oct. 4, 2018

(65) Prior Publication Data
US 2020/0231133 A1    Jul. 23, 2020

(30) Foreign Application Priority Data

Mar. 31, 2017 (JP) ................... 2017-070490
Aug. 23, 2017 (JP) ................... 2017-160403

(51) Int. Cl.
*B60T 13/20* (2006.01)

(52) U.S. Cl.
CPC .................. *B60T 13/20* (2013.01)

(58) Field of Classification Search
CPC .......... B60T 8/172; B60T 13/18; B60T 13/20; B60T 13/741

(Continued)

(56) References Cited

U.S. PATENT DOCUMENTS 8,777,336 B2 * 7/2014 Matsuura ............... B60L 50/61
                                                    303/155
9,616,865 B2 * 4/2017 Yasui .................... B60T 13/741
(Continued)

FOREIGN PATENT DOCUMENTS

JP         5866817 B2    2/2016

OTHER PUBLICATIONS

International Search Report dated Jun. 12, 2018 in PCT/JP2018/013389 filed Mar. 29, 2018.

*Primary Examiner* — Christopher P Schwartz
(74) *Attorney, Agent, or Firm* — Oblon, McClelland, Maier & Neustadt, L.L.P.

(57) ABSTRACT

A control device including a fluid pressure control unit for controlling a pressure in a wheel cylinder by driving an electric motor of a pump on the basis of a command value; a motor target calculation unit for calculating a motor speed target value in accordance with an amount of increase in a fluid pressure target value; and a difference calculation unit for deriving a calculated value representing a difference obtained by subtracting the actual value from the target value for either the electric motor rotation speed or the pressure. The fluid pressure control unit derives the command value such that when the motor speed target value is less than the previous actual value for the electric motor rotation speed, the previous actual value is made the upper-limit of the command value, and the command value increases in proportion to the motor speed target value and to the calculated value.

5 Claims, 7 Drawing Sheets

(58) Field of Classification Search
USPC .................. 303/3, 10, 15, 20; 701/70–72
See application file for complete search history.

(56) References Cited

U.S. PATENT DOCUMENTS

| | | |
|---|---|---|
| 2013/0057051 A1 | 3/2013 | Matsuura et al. |
| 2015/0081186 A1* | 3/2015 | Yasui .................. B60T 13/741 701/70 |
| 2020/0180576 A1* | 6/2020 | Motoyama ................ B60T 8/17 |

* cited by examiner

WC PRESSURE

ROTATION SPEED OF ELECTRIC MOTOR

CORRECTION VALUE

WC PRESSURE

ROTATION SPEED OF
ELECTRIC MOTOR

CORRECTION
VALUE

WC PRESSURE

ROTATION SPEED OF ELECTRIC MOTOR

CORRECTION VALUE

BRAKING CONTROL DEVICE FOR VEHICLE

TECHNICAL FIELD

The present invention relates to a braking control device for a vehicle applied to a braking device including an electric pump for supplying a brake fluid into a wheel cylinder.

BACKGROUND ART

As a braking device for a vehicle, there is known a device including a differential pressure adjustment valve which is disposed in a fluid passage connecting a wheel cylinder and a master cylinder, a pump which supplies a brake fluid to the wheel cylinder in relation to the differential pressure adjustment valve in the fluid passage, and an electric motor which is a power source of the pump. In such a braking device, it is possible to adjust a differential pressure between the master cylinder and the wheel cylinder, that is, a fluid pressure inside the wheel cylinder by controlling at least one of an opening degree command value for the differential pressure adjustment valve and a brake fluid discharge amount of the pump.

PTL 1 describes an example of a braking control device which increases a brake fluid discharge amount of a pump when a fluid pressure target value corresponding to a target value of a fluid pressure inside a wheel cylinder increases. In the braking control device described in Patent Document 1, a target value of a rotation speed of an electric motor is calculated so that the target value of the rotation speed of the electric motor increases as an increase amount of the fluid pressure target value increases when the fluid pressure target value is increased. Then, the driving of the electric motor is controlled on the basis of the target value of the rotation speed calculated in this way. Accordingly, since the amount of the brake fluid supplied to the wheel cylinder increases as the brake fluid discharge amount of the pump increases, it is possible to increase the fluid pressure inside the wheel cylinder so as to follow an increase in the fluid pressure target value.

CITATION LIST

Patent Literature

PTL 1: Japanese Patent No. 5866817

SUMMARY OF INVENTION

Technical Problem

Incidentally, in the braking control device described in Patent Document 1, an increase speed of the target value of the rotation speed of the electric motor increases as an increase speed of the fluid pressure target value increases. In general, the operation noise of the electric motor increases as the rotation speed of the electric motor increases. For that reason, since the magnitude of the operation noise of the electric motor largely changes when the rotation speed of the electric motor largely changes, there is concern that an occupant of a vehicle may feel uncomfortable.

As a method of suppressing a change in the operation noise of the electric motor, a method of suppressing an abrupt increase in rotation speed by providing an upper-limit in the rotation speed of the electric motor is considered. However, in this case, when the target value of the rotation speed of the electric motor exceeds the upper-limit in order to increase the increase amount of the fluid pressure target value, the rotation speed of the electric motor cannot be increased to the target value. As a result, although an abrupt change in the magnitude of the operation noise of the electric motor can be suppressed, the fluid pressure inside the wheel cylinder cannot be increased to the fluid pressure target value and the time for increasing the fluid pressure to the fluid pressure target value increases, thereby deteriorating controllability of the fluid pressure.

That is, there is room for improvement in terms of preventing the occupant of the vehicle from easily feeling uncomfortable by suppressing a change in the operation noise of the electric motor while suppressing deterioration of controllability of the fluid pressure inside the wheel cylinder.

Solution to Problem

A braking control device for a vehicle used to solve the above-described problems is a device applied to a braking device of a vehicle including a pump for supplying a brake fluid to a wheel cylinder provided for a vehicle wheel and an electric motor corresponding to a power source of the pump. An aspect of the braking control device includes: a fluid pressure control unit which controls a fluid pressure inside the wheel cylinder by driving the electric motor on the basis of a command value for a rotation speed of the electric motor every predetermined control cycle; a motor target calculation unit which calculates a motor speed target value corresponding to a target value of the rotation speed of the electric motor every control cycle so that the motor speed target value increases as an increase amount of a fluid pressure target value corresponding to a target value of the fluid pressure inside the wheel cylinder increases; and a difference calculation unit which derives a calculated value that is a value corresponding to a difference obtained by subtracting an actual value of one of the rotation speed of the electric motor and the fluid pressure inside the wheel cylinder from a target value thereof every control cycle. Then, when the motor speed target value calculated by the motor target calculation unit is smaller than a previous value of the actual value of the rotation speed of the electric motor, the fluid pressure control unit sets the previous value of the actual value of the rotation speed of the electric motor as an upper-limit of the command value and derives the command value so that the command value increases as the motor speed target value increases and the command value increases as the calculated value derived by the difference calculation unit increases.

Additionally, the "actual value" mentioned herein is a concept including not only a value detected by a detection system such as a sensor but also a value estimated and calculated on the basis of a control mode of the electric motor or the like.

According to the above-described configuration, when the fluid pressure target value increases, the target value of the rotation speed of the electric motor increases. Further, the calculated value increases as a difference obtained by subtracting the actual value of the rotation speed of the electric motor from the motor speed target value increases or a difference obtained by subtracting the actual value of the fluid pressure inside the wheel cylinder from the fluid pressure target value increases. Then, when the motor speed target value is smaller than the previous value of the actual value of the rotation speed of the electric motor, the command value can be set to be larger than the motor speed target value in a range not larger than the previous value of the actual value of the rotation speed of the electric motor. For that reason, it takes less time to increase the fluid pressure inside the wheel cylinder to the fluid pressure target value by an amount that the brake fluid discharge amount of the pump increases as compared with a case in which the command value is maintained at the motor speed target value.

When the magnitude of the operation noise of the electric motor is constant, the occupant of the vehicle does not feel so uncomfortable with the operation noise of the electric motor. However, when the magnitude of the operation noise of the electric motor abruptly increases, the occupant of the vehicle tends to feel uncomfortable with the operation noise as compared with a case in which the magnitude of the operation noise is constant. Regarding this point, according to the above-described configuration, when the motor speed target value is smaller than the previous value of the actual value of the rotation speed of the electric motor, the command value does not exceed the previous value of the actual value of the rotation speed of the electric motor. For that reason, it is possible to suppress an abrupt increase in the rotation speed of the electric motor and to suppress an abrupt increase in the magnitude of the operation noise of the electric motor.

Thus, according to the above-described configuration, it is possible to prevent the occupant of the vehicle from easily feeling uncomfortable due to a change in the magnitude of the operation noise of the electric motor while suppressing deterioration of controllability of the fluid pressure inside the wheel cylinder.

Further, an aspect of a braking control device for a vehicle used to solve the above-described problems includes: a fluid pressure control unit which controls a fluid pressure inside the wheel cylinder by deriving a motor speed command value corresponding to a command value for a rotation speed of the electric motor every predetermined control cycle and driving the electric motor on the basis of the motor speed command value; a pump target calculation unit which calculates a pump discharge amount target value corresponding to a target value of a brake fluid discharge amount of the pump every control cycle so that the pump discharge amount target value increases as an increase amount of a fluid pressure target value corresponding to a target value of the fluid pressure inside the wheel cylinder increases; a difference calculation unit which derives a calculated value that is a value corresponding to a difference obtained by subtracting an actual value of one of the brake fluid discharge amount of the pump and the fluid pressure inside the wheel cylinder from a target value thereof every control cycle; and a pump command value deriving unit which derives a pump discharge amount command value corresponding to a command value for the brake fluid discharge amount of the pump on the basis of the pump discharge amount target value calculated by the pump target calculation unit and the calculated value derived by the difference calculation unit. Then, the fluid pressure control unit derives the motor speed command value so that the motor speed command value increases as the pump discharge amount command value derived by the pump command value deriving unit increases. Further, when the pump discharge amount target value calculated by the pump target calculation unit is smaller than a previous value of the actual value of the brake fluid discharge amount of the pump, the pump command value deriving unit sets the previous value of the actual value of the brake fluid discharge amount of the pump as an upper-limit of the pump discharge amount command value and derives the pump discharge amount command value so that the pump discharge amount command value increases as the pump discharge amount target value increases and the pump discharge amount command value increases as the calculated value derived by the difference calculation unit increases.

According to the above-described configuration, when the fluid pressure target value increases, the pump discharge amount target value increases. Further, the calculated value increases as a difference obtained by subtracting the actual value of the brake fluid discharge amount of the pump from the pump discharge amount target value increases or a difference obtained by subtracting the actual value of the fluid pressure inside the wheel cylinder from the fluid pressure target value increases. Then, when the pump discharge amount target value is smaller than the previous value of the actual value of the brake fluid discharge amount of the pump, the pump discharge amount command value can be set to be larger than the pump discharge amount target value in a range not larger than the previous value of the actual value of the brake fluid discharge amount of the pump. The pump discharge amount command value derived in this way is converted into the motor speed command value and the driving of the electric motor is controlled on the basis of the motor speed command value. For that reason, it takes less time to increase the fluid pressure inside the wheel cylinder to the fluid pressure target value by an amount that the brake fluid discharge amount of the pump increases as compared with a case in which the pump discharge amount command value is maintained at the pump discharge amount target value.

Further, according to the above-described configuration, when the pump discharge amount target value is smaller than the previous value of the actual value of the brake fluid discharge amount of the pump, the pump discharge amount command value is not larger than the previous value of the actual value of the brake fluid discharge amount of the pump. That is, since it is possible to suppress an abrupt increase in the brake fluid discharge amount, it is possible to suppress an abrupt increase in the rotation speed of the electric motor. As a result, it is possible to suppress an abrupt increase in the magnitude of the operation noise of the electric motor.

Thus, according to the above-described configuration, it is possible to prevent the occupant of the vehicle from easily feeling uncomfortable due to a change in the magnitude of the operation noise of the electric motor and the pump while suppressing deterioration of controllability of the fluid pressure inside the wheel cylinder.

Figure 3A:
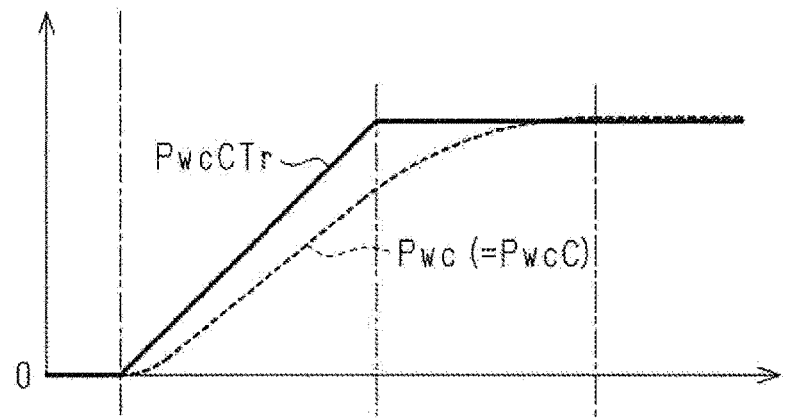
Figure 3B:
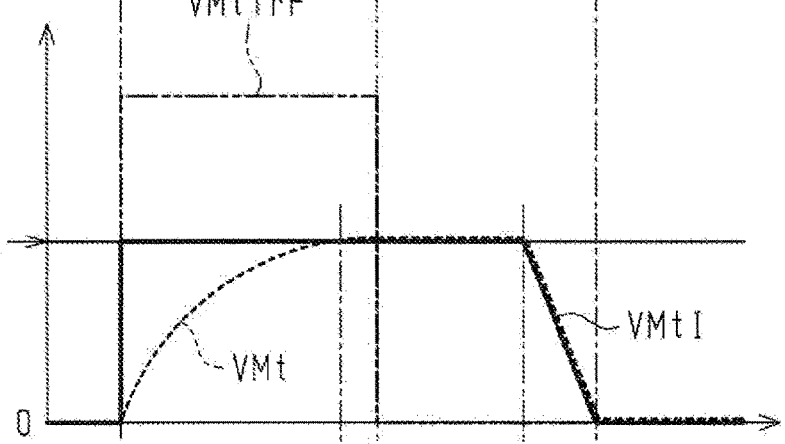
Figure 3C:
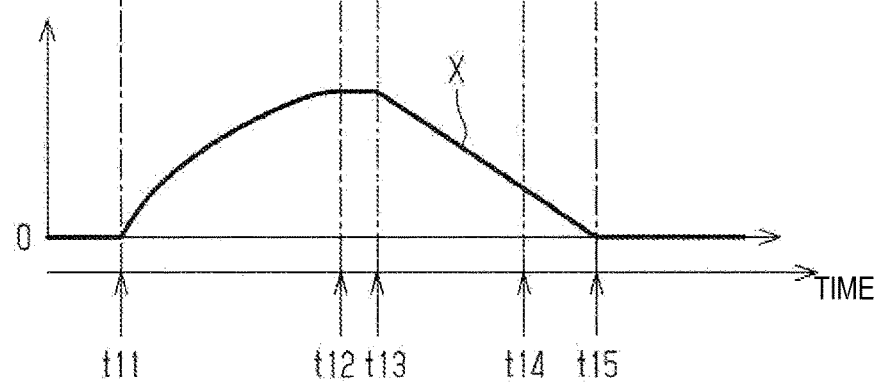

Parts (a) to (c) of FIG. 3 are timing charts during braking control.

Figure 4A:
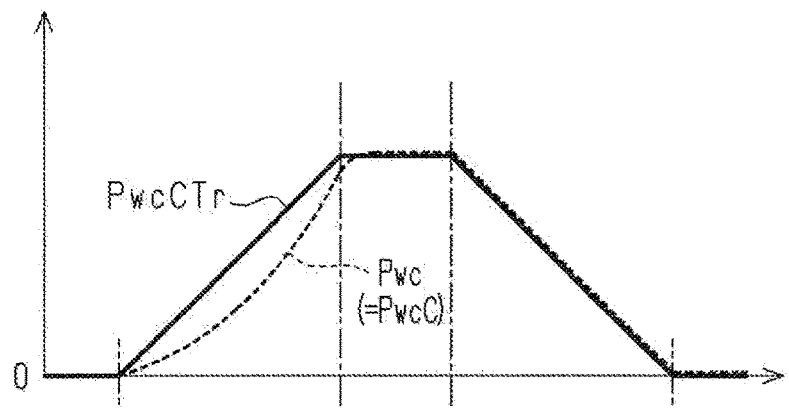
Figure 4B:
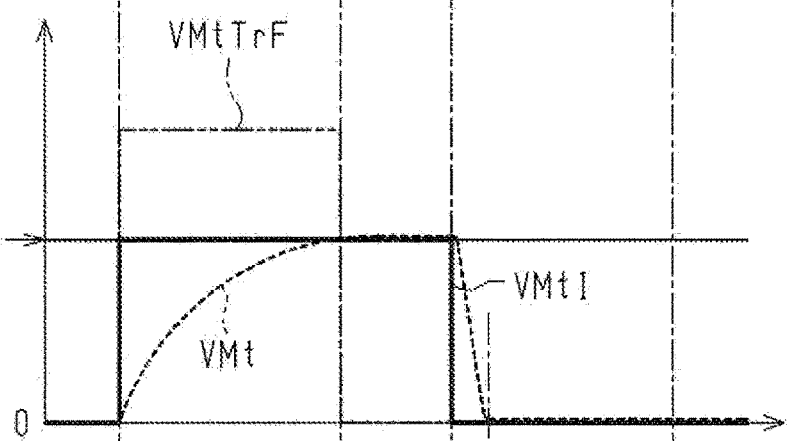
Figure 4C:
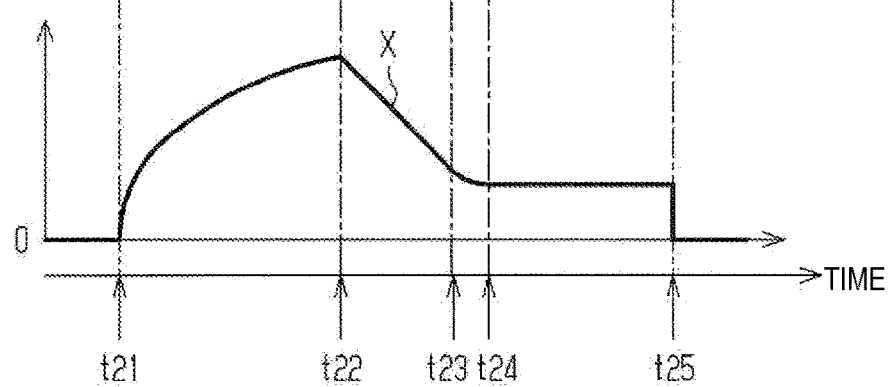

Parts (a) to (c) of FIG. 4 are timing charts during braking control.

Figure 5A:
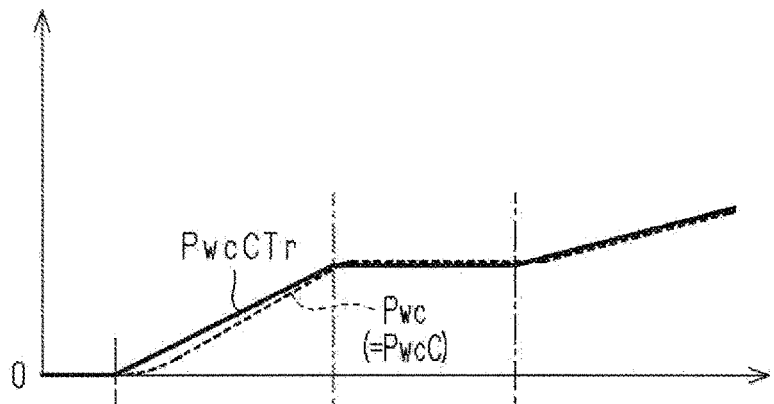
Figure 5B:
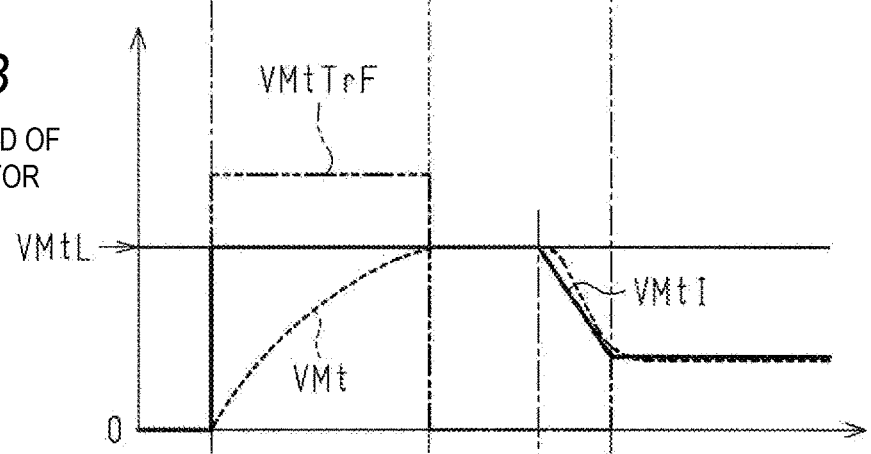
Figure 5C:
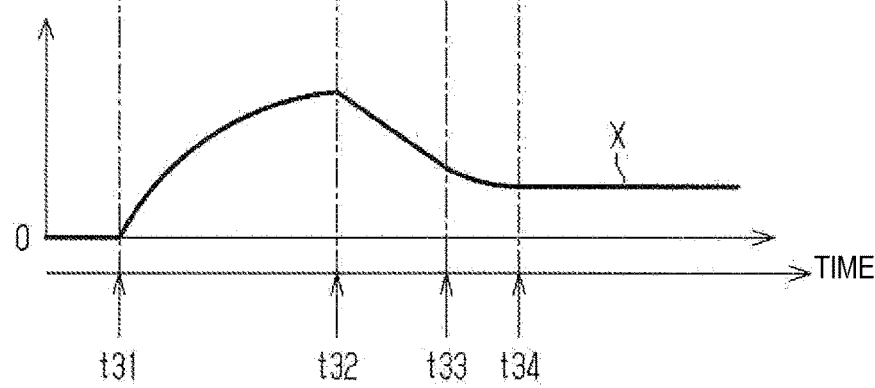

Parts (a) to (c) of FIG. 5 are timing charts during braking control.

Figure 6:
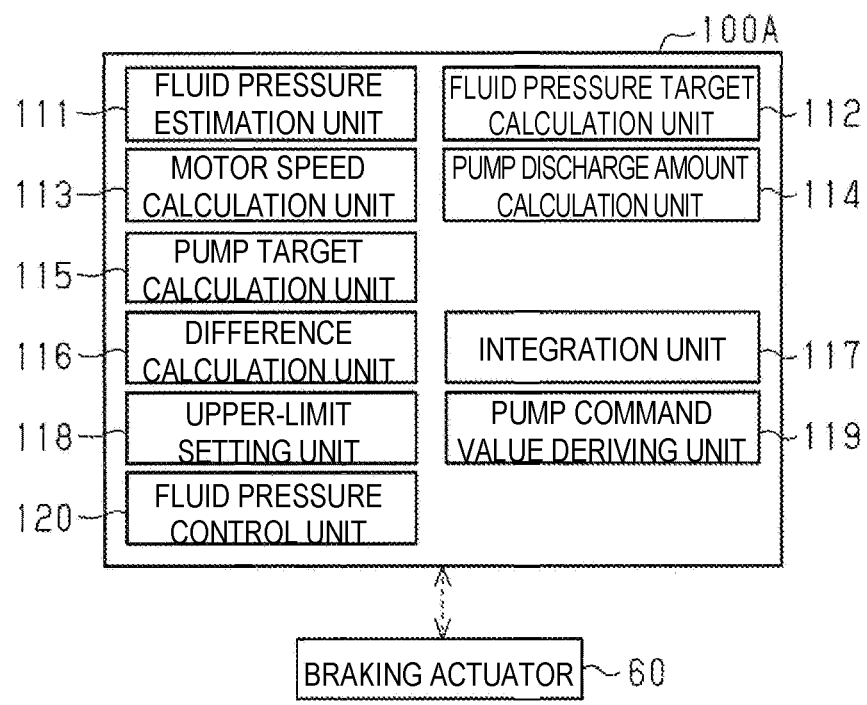

FIG. 6 is a block diagram illustrating a control device which is a second embodiment of the braking control device for the vehicle and a braking actuator controlled by the control device.

Figure 7:
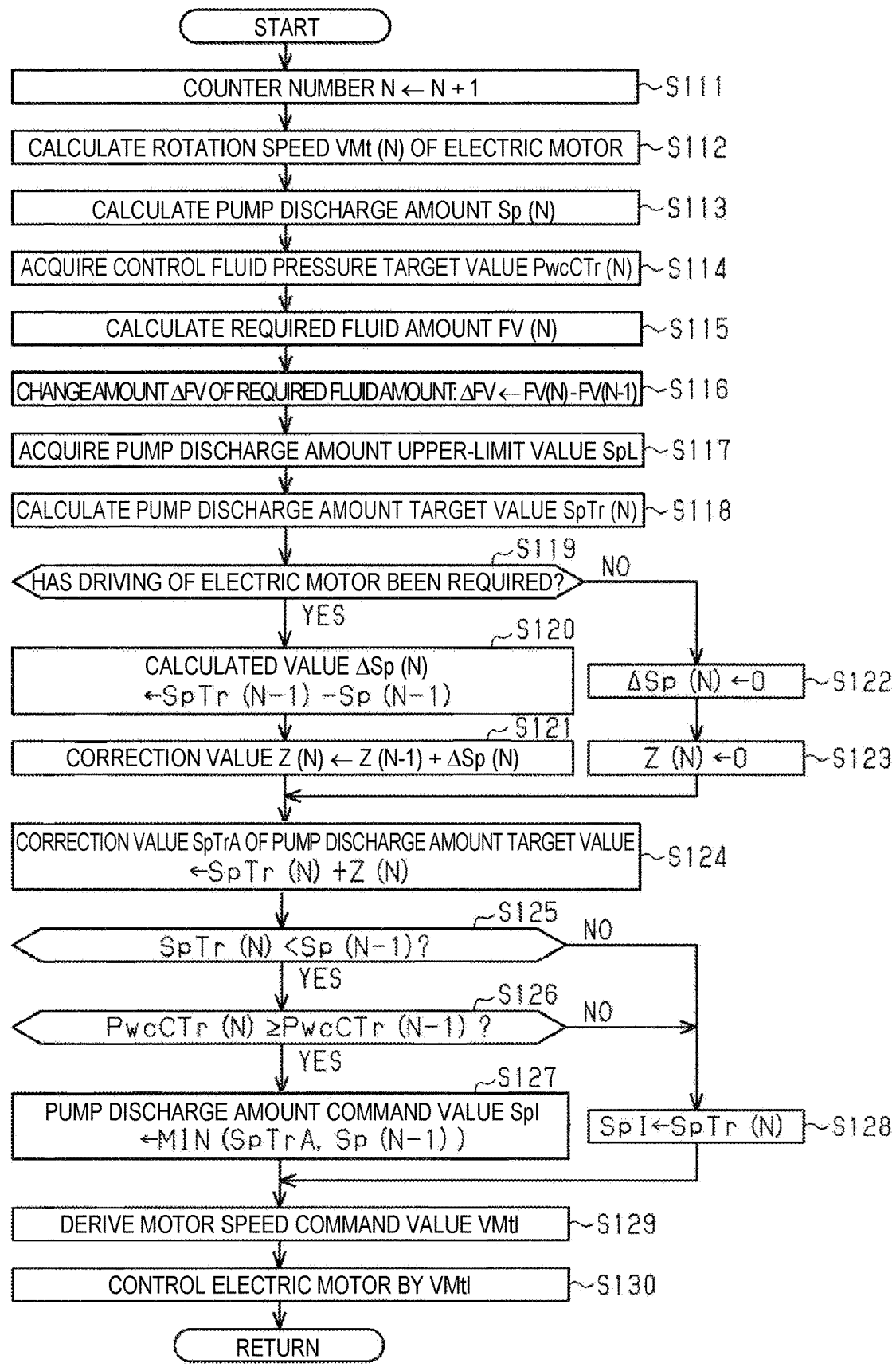

FIG. 7 is a flowchart describing a process routine which is performed by the control device.

DESCRIPTION OF EMBODIMENTS

First Embodiment

Hereinafter, a first embodiment of a braking control device for a vehicle will be described with reference to FIGS. 1 to 5.

Figure 1:
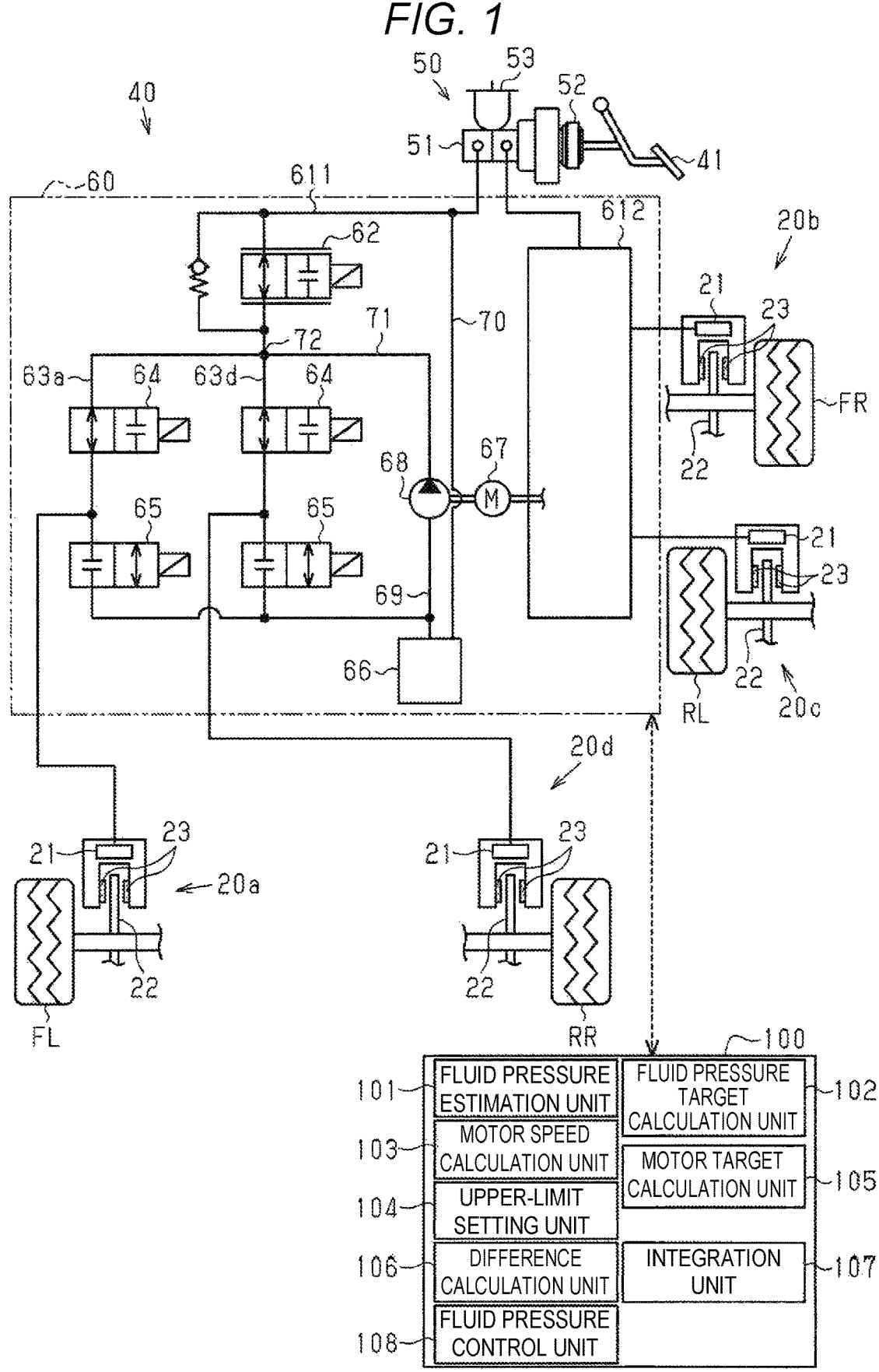
FIG. 1 is a schematic configuration diagram illustrating a vehicle including a control device which is a first embodiment of a braking control device for a vehicle.

FIG. 1 illustrates a vehicle including a control device 100 which is a braking control device of the embodiment. The vehicle includes a plurality of (that is, the same number as vehicle wheels) braking mechanisms 20a, 20b, 20c, and 20d which are respectively individually provided in vehicle wheels FL, FR, RL, and RR and a braking device 40.

Each of the braking mechanisms 20a to 20d includes a wheel cylinder 21 to which a brake fluid is supplied, a disk rotor 22 which rotates along with the vehicle wheels FL, FR, RL, and RR, and a friction material 23 which relatively moves in a direction moving close to and away from the disk rotor 22. Then, in the braking mechanisms 20a to 20d, a force for pressing the friction material 23 against the disk rotor 22, that is, a braking force for the vehicle wheels FL, FR, RL, and RR can be increased as a WC pressure Pwc which is a fluid pressure inside the wheel cylinder 21 increases.

The braking device 40 includes a fluid pressure generation device 50 which is connected to a braking operation member 41 such as a brake pedal operated by a driver and a braking actuator 60 which is able to individually adjust the WC pressure Pwc inside each wheel cylinder 21. In addition, an operation in which the driver operates the braking operation member 41 is referred to as a "braking operation" and a force in which the driver operates the braking operation member 41 is referred to as a "braking operation force" in some cases.

The fluid pressure generation device 50 includes a master cylinder 51, a booster 52 which assists the braking operation force input to the braking operation member 41, and a reservoir tank 53 which stores a brake fluid. When the braking operation force assisted by the booster 52 is input, an MC pressure Pmc which is a fluid pressure in response to the braking operation force is generated in the master cylinder 51.

The braking actuator 60 is provided with two fluid pressure circuits 611 and 612. The wheel cylinder 21 corresponding to the left front wheel FL and the wheel cylinder 21 corresponding to the right rear wheel RR are connected to the first fluid pressure circuit 611. Further, the wheel cylinder 21 corresponding to the right front wheel FR and the wheel cylinder 21 corresponding to the left rear wheel RL are connected to the second fluid pressure circuit 612. Then, when the brake fluid flows from the fluid pressure generation device 50 to the first and second fluid pressure circuits 611 and 612, the brake fluid is supplied to the wheel cylinder 21.

A fluid passage which connects the master cylinder 51 and the wheel cylinder 21 in the first fluid pressure circuit 611 is provided with a differential pressure adjustment valve 62 which adjusts a differential pressure between the master cylinder 51 and the wheel cylinder 21. Further, a fluid passage 63a for the left front wheel and a fluid passage 63d for the right rear wheel are provided on the side of the wheel cylinder 21 in relation to the differential pressure adjustment valve 62 in the first fluid pressure circuit 611. Then, these fluid passages 63a and 63d are provided with a holding valve 64 which is closed at the time of regulating an increase in the WC pressure Pwc and a pressure reducing valve 65 which is opened at the time of decreasing the WC pressure Pwc. Additionally, the differential pressure adjustment valve 62 is a normally open linear solenoid valve, the holding valve 64 is a normally open solenoid valve, and the pressure reducing valve 65 is a normally closed solenoid valve.

Further, a reservoir 66 which temporarily stores the brake fluid flowing out of the wheel cylinder 21 through the pressure reducing valve 65 and a pump 68 which is operated on the basis of the driving of an electric motor 67 are connected to the first fluid pressure circuit 611. That is, the electric motor 67 is a "power source of the pump 68". The reservoir 66 is connected to the pump 68 through an intake fluid passage 69 and is connected to a fluid passage on the side of the master cylinder 51 in relation to the differential pressure adjustment valve 62 through a master fluid passage 70. Further, the pump is connected to a connection portion 72 between the differential pressure adjustment valve 62 and the holding valve 64 through a supply fluid passage 71. For that reason, when the electric motor 67 is driven, the pump 68 draws the brake fluid in the master cylinder 51 through the reservoir 66 and discharges the brake fluid to the connection portion 72.

Additionally, since the structure of the second fluid pressure circuit 612 is substantially the same as the structure of the first fluid pressure circuit 611, the description of the structure of the second fluid pressure circuit 612 is omitted in the present specification.

Next, the control device 100 will be described with reference to FIG. 1.

As illustrated in FIG. 1, the control device 100 includes a fluid pressure estimation unit 101, a fluid pressure target calculation unit 102, a motor speed calculation unit 103, an upper-limit setting unit 104, a motor target calculation unit 105, a difference calculation unit 106, an integration unit 107, and a fluid pressure control unit 108 as function units for driving the electric motor 67, that is, controlling the brake fluid discharge amount of the pump 68.

The fluid pressure estimation unit 101 estimates and calculates the WC pressure Pwc inside each wheel cylinder 21. For example, the fluid pressure estimation unit 101 can calculate the pressure on the basis of the MC pressure Pmc in the master cylinder 51, a rotation speed VMt of the electric motor 67 corresponding to the rotation speed of the output shaft of the electric motor 67, the opening degree command value of the differential pressure adjustment valve 62, and the like. In this case, the WC pressure Pwc increases as the MC pressure Pmc increases, increases as the rotation speed VMt of the electric motor 67 increases, and increases as the opening degree command value for the differential pressure adjustment valve 62 decreases.

Further, the fluid pressure estimation unit 101 also calculates a control fluid pressure PwcC which is a differential pressure between the master cylinder 51 in relation to the differential pressure adjustment valve 62 and the wheel cylinder 21 in relation to the differential pressure adjustment valve 62. For example, the fluid pressure estimation unit 101 can set a difference obtained by subtracting the MC pressure Pmc from the estimated and calculated WC pressure Pwc as the control fluid pressure PwcC.

The fluid pressure target calculation unit 102 calculates a control fluid pressure target value PwcCTr which is the target value of the control fluid pressure PwcC. The control fluid pressure target value PwcCTr is an example of the "target value for the WC pressure Pwc inside the wheel cylinder 21". For example, the fluid pressure target calculation unit 102 can calculate the control fluid pressure target value PwcCTr so that the control fluid pressure target value PwcCTr increases as the target value of the braking force for the vehicle increases.

The motor speed calculation unit 103 calculates the rotation speed VMt of the electric motor 67. For example, the motor speed calculation unit 103 can calculate the rotation speed VMt on the basis of a signal output from a resolver provided in the electric motor 67. That is, in the embodiment, the rotation speed VMt calculated by the motor speed calculation unit 103 corresponds to an example of the "actual value of the rotation speed".

The upper-limit setting unit 104 calculates a motor speed upper-limit value VMtL which is an upper-limit value of the rotation speed VMt of the electric motor 67 in response to the type of braking control to be performed. Specifically, when high urgent braking control such as emergency automatic braking or antilock braking control is performed for the purpose of avoiding a collision with an obstacle, the upper-limit setting unit 104 sets the motor speed upper-limit value VMtL to a relatively large value. Meanwhile, when low urgent braking control is performed, the upper-limit setting unit 104 sets the motor speed upper-limit value VMtL to a small value as compared with a case in which high urgent braking control is performed. In addition, as low urgent braking control, for example, automatic braking with adaptive cruise control and torque vectoring control that applies a braking force to the inner drive wheel at the time of turning the vehicle to increase the driving torque transmitted to the outer drive wheel at the time of turning the vehicle can be exemplified.

The motor target calculation unit 105 calculates a motor speed target value VMtTr which is a target value of the rotation speed VMt of the electric motor 67 on the basis of the control fluid pressure target value PwcCTr calculated by the fluid pressure target calculation unit 102 and the motor speed upper-limit value VMtL set by the upper-limit setting unit 104.

The difference calculation unit 106 derives a calculated value ΔVMt which is a difference obtained by subtracting the rotation speed VMt of the electric motor 67 calculated by the motor speed calculation unit 103 from the motor speed target value VMtTr calculated by the motor target calculation unit 105.

The integration unit 107 derives a correction value X which is a value obtained by integrating the calculated value ΔVMt calculated by the difference calculation unit 106.

The fluid pressure control unit 108 derives a command value VMtI for the rotation speed VMt of the electric motor 67 and drives the electric motor 67 on the basis of the command value VMtI to control the WC pressure Pwc inside the wheel cylinder 21, that is, the control fluid pressure PwcC. As the command value VMtI increases, the rotation speed VMt of the electric motor 67 increases and the brake fluid discharge amount of the pump 68 increases.

Next, a process routine which is performed by the control device 100 in order to drive the electric motor 67 during the braking control will be described with reference to FIG. 2. This process routine is performed every predetermined control cycle while the braking control is performed.

Figure 2:
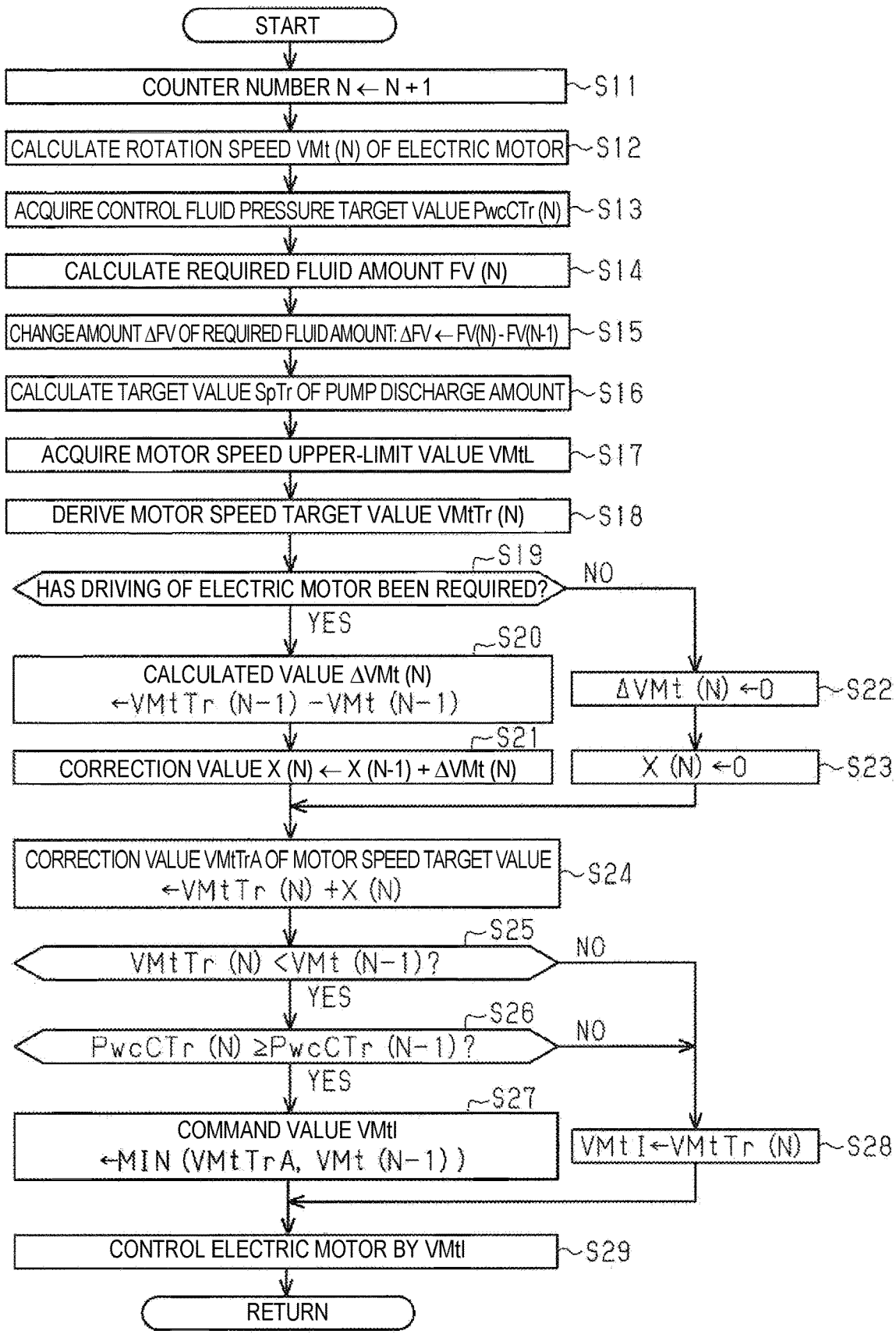
FIG. 2 is a flowchart describing a process routine which is performed by the control device.

As illustrated in FIG. 2, in this process routine, in the first step S11, a count number N which is the number of times of performing of this process routine from the start of braking control is incremented by "1". This count number N is reset to "0" when the braking control ends so that this process routine is not performed. Then, in the next step S12, the rotation speed VMt (N) of the electric motor 67 is calculated by the motor speed calculation unit 103. Next, in step S13, a control fluid pressure target value PwcCTr (N) calculated by the fluid pressure target calculation unit 102 is acquired. Additionally, the control fluid pressure target value PwcCTr is calculated at the same control cycle as that of this process routine.

Then, in the next step S14, the control fluid pressure target value PwcCTr (N) is converted into a required fluid amount FV (N) by the motor target calculation unit 105. The required fluid amount FV (N) is the amount of the brake fluid to be supplied from the pump 68 to the wheel cylinder 21 in order to allow the control fluid pressure PwcC to be equal to the control fluid pressure target value PwcCTr. For that reason, the required fluid amount FV (N) increases as the control fluid pressure target value PwcCTr increases.

Next, in step S15, a change amount ΔFV of the required fluid amount FV is calculated by the motor target calculation unit 105. That is, when the required fluid amount FV derived when performing this process routine at a previous time is set as a previous value FV (N−1) of the required fluid amount, the motor target calculation unit 105 sets a difference obtained by subtracting the previous value FV (N−1) of the required fluid amount from the required fluid amount FV (N) derived in step S14 as the change amount ΔFV.

Then, in the next step S16, a target value SpTr of the pump discharge amount which is a discharge amount per unit time of the pump 68 is calculated by the motor target calculation unit 105. The target value SpTr of the pump discharge amount can be derived by adding the amount of the brake fluid flowing to the differential pressure adjustment valve 62 in the brake fluid discharged from the pump 68 to the change amount ΔFV of the required fluid amount calculated in step S15. In addition, a relief amount which is the amount of the brake fluid flowing to the differential pressure adjustment valve 62 decreases as the opening degree command value for the differential pressure adjustment valve 62 decreases, that is, an electromagnetic force generated in the differential pressure adjustment valve 62 increases. Next, in step S17, the motor speed upper-limit value VMtL set by the upper-limit setting unit 104 is acquired.

Then, in the next step S18, a motor speed target value VMtTr (N) is calculated by the motor speed calculation unit 103. That is, the motor speed calculation unit 103 sets a product obtained by multiplying a conversion factor M by the target value SpTr of the pump discharge amount calculated in step S16 as a candidate value VMtTrF of the motor speed target value. The conversion factor M is a factor for converting the brake fluid discharge amount of the pump 68 into the rotation speed of the electric motor 67. Then, the motor speed calculation unit 103 derives the motor speed target value VMtTr (N) on the basis of the motor speed upper-limit value VMtL and the candidate value VMtTrF of the motor speed target value. Specifically, the motor speed calculation unit 103 sets a smaller value of the motor speed upper-limit value VMtL and the candidate value VMtTrF of the motor speed target value as the motor speed target value VMtTr (N). In addition, the candidate value VMtTrF of the motor speed target value is a value corresponding to the change amount ΔFV of the required fluid amount which is the change amount of the control fluid pressure target value PwcCTr as described above. Thus, when the candidate value VMtTrF of the motor speed target value is equal to or smaller than the motor speed upper-limit value VMtL, the motor speed calculation unit 103 can calculate the motor speed target value VMtTr (N) so that the motor speed target value VMtTr (N) increases as the change amount ΔFV of the required fluid amount increases, that is, the increase amount of the control fluid pressure target value PwcCTr increases.

Next, in step S19, it is determined whether the driving of the electric motor 67 is required. When the driving is required (step S19: YES), the process proceeds to the next step S20. In the next step S20, a calculated value ΔVMt (N) which is a difference obtained by subtracting the previous value VMt (N−1) of the rotation speed of the electric motor 67 from the previous value VMtTr (N−1) of the motor speed target value is derived by the difference calculation unit 106. The previous value VMtTr (N−1) of the motor speed target value is the motor speed target value VMtTr which is derived when this process routine is performed at a previous time. Further, the previous value VMt (N−1) of the rotation speed of the electric motor 67 is the rotation speed VMt when this process routine is performed at a previous time. Next, in step S21, a sum obtained by adding the calculated value ΔVMt (N) to the previous value X (N−1) of the correction value is set as a correction value X (N) by the integration unit 107. That is, in step S21, the calculated value ΔVMt is integrated. Then, the process proceeds to step S24 to be described later.

Meanwhile, in step S19, when the driving of the electric motor 67 is not required (NO), the process proceeds to the next step S22. In the next step S22, the calculated value ΔVMt (N) is set to be equal to "0". Next, in step S23, the correction value X (N) is set to be equal to "0". Then, the process proceeds to the next step S24.

In step S24, a correction value VMtTrA of the motor speed target value is calculated by the fluid pressure control unit 108. That is, the fluid pressure control unit 108 sets the correction value VMtTrA of the motor speed target value to be equal to the sum of the motor speed target value VMtTr (N) derived in step S18 and the correction value X (N) derived in step S21 or step S23. Next, in step S25, it is determined whether the motor speed target value VMtTr (N) calculated in step S18 is smaller than the previous value VMt (N−1) of the rotation speed of the electric motor 67 by the fluid pressure control unit 108. When the motor speed target value VMtTr (N) is equal to or larger than the previous value VMt (N−1) of the rotation speed (step S25: NO), the process proceeds to step S28 to be described later. Meanwhile, when the motor speed target value VMtTr (N) is smaller than the previous value VMt (N−1) of the rotation speed (step S25: YES), the process proceeds to the next step S26.

In step S26, it is determined whether the control fluid pressure target value PwcCTr (N) acquired in step S13 is equal to or larger than the previous value PwcCTr (N−1) of the control fluid pressure target value by the fluid pressure control unit 108. The previous value PwcCTr (N−1) of the control fluid pressure target value is the control fluid pressure target value PwcCTr acquired when this process routine is performed at a previous time. For that reason, it is not possible to determine that the control fluid pressure target value PwcCTr decreases when the control fluid pressure target value PwcCTr (N) is equal to or larger than the previous value PwcCTr (N−1) of the control fluid pressure target value. Meanwhile, it is possible to determine that the control fluid pressure target value PwcCTr decreases when the control fluid pressure target value PwcCTr (N) is smaller than the previous value PwcCTr (N−1) of the control fluid pressure target value.

Then, when the control fluid pressure target value PwcCTr (N) is equal to or larger than the previous value PwcCTr (N−1) of the control fluid pressure target value (step S26: YES), the process proceeds to the next step S27. Then, in step S27, the command value VMtI for the rotation speed VMt of the electric motor 67 is derived by the fluid pressure control unit 108. Specifically, the fluid pressure control unit 108 sets a smaller value of the previous value VMt (N−1) of the rotation speed of the electric motor 67 and the correction value VMtTrA of the motor speed target value derived in step S24 as the command value VMtI. Then, the process proceeds to step S29 to be described later.

Meanwhile, in step S26, when the control fluid pressure target value PwcCTr (N) is smaller than the previous value PwcCTr (N−1) of the control fluid pressure target value (NO), the process proceeds to the next step S28.

Then, in step S28, the command value VMtI for the rotation speed of the electric motor 67 is set to be equal to the motor speed target value VMtTr (N) calculated in step S18 by the fluid pressure control unit 108. Then, the process proceeds to the next step S29.

Then, in step S29, the driving of the electric motor 67 is controlled on the basis of the command value VMtI derived in step S27 or step S28 by the fluid pressure control unit 108. Subsequently, this process routine temporarily ends.

Next, an operation at the time of increasing the WC pressure Pwc inside the wheel cylinder 21 and maintaining the WC pressure Pwc will be described along with an effect thereof with reference to FIG. 3. Additionally, in the example shown in FIG. 3, the opening degree command value of the differential pressure adjustment valve 62 is maintained at a constant value at the time of controlling the control fluid pressure PwcC, that is, the WC pressure Pwc.

As shown in parts (a), (b), and (c) of FIG. 3, when the braking control starts from the first timing t11, the control fluid pressure target value PwcCTr increases. Then, in the braking actuator 60, the operation of the pump 68, that is, the driving of the electric motor 67 is started and the opening degree command value of the differential pressure adjustment valve 62 is adjusted. In the example shown in FIG. 3, since the control fluid pressure target value PwcCTr increases in a period from the first timing t11 to the third timing t13, the change amount ΔFV of the required fluid amount is larger than "0". For that reason, the candidate value VMtTrF of the calculated motor speed target value increases. In the example shown in FIG. 3, the candidate value VMtTrF is larger than the motor speed upper-limit value VMtL. As a result, the motor speed target value VMtTr is equal to the motor speed upper-limit value VMtL in a period from the first timing t11 to the third timing t13. In that period, since the motor speed target value VMtTr (N) is not smaller than the previous value VMt (N−1) of the rotation speed of the electric motor 67, the command value VMtI is maintained at the motor speed target value VMtTr. Then, the driving of the electric motor 67 is controlled on the basis of the command value VMtI.

Additionally, the rotation speed VMt of the electric motor 67 increases toward the motor speed target value VMtTr in a period from the first timing t11 to the third timing t13. In that period, since the rotation speed VMt is lower than the motor speed target value VMtTr in a period from the first timing t11 to the second timing t12, the calculated value ΔVMt is larger than "0". For that reason, the correction value X which is an integrated value of the calculated value ΔVMt gradually increases.

Then, the control fluid pressure target value PwcCTr is maintained after the third timing t13. Then, since the change amount ΔFV of the required fluid amount is equal to "0", the candidate value VMtTrF of the motor speed target value is also equal to "0". In this way, when the candidate value VMtTrF is smaller than the motor speed upper-limit value VMtL, the motor speed target value VMtTr is equal to the candidate value VMtTrF.

In a period from the third timing t13 to the fifth timing t15, the motor speed target value VMtTr (N) is smaller than the previous value VMt (N−1) of the rotation speed of the electric motor 67. Further, the control fluid pressure target value PwcCTr does not decrease. Thus, a smaller value of the previous value VMt (N−1) of the rotation speed of the electric motor 67 and the correction value VMtTrA of the motor speed target value which is a sum obtained by adding the correction value X (N) to the motor speed target value VMtTr (N) is derived as the command value VMtI. That is, the previous value VMt (N−1) of the rotation speed is set to the upper-limit of the command value and the command value VMtI is derived so that the command value VMtI increases as the motor speed target value VMtTr (N) increases and the command value VMtI increases as the calculated value ΔVMt (N) increases.

Additionally, in the example shown in FIG. 3, since the correction value X is large in a period from the third timing t13 to the fourth timing t14, the correction value VMtTrA of the motor speed target value is equal to or larger than the previous value VMt (N−1) of the rotation speed of the electric motor 67. As a result, the command value VMtI is set to be equal to the previous value VMt (N−1) of the rotation speed. In this way, when the command value VMtI is set to be equal to the previous value VMt (N−1) of the rotation speed, the correction value X gradually decreases as shown in (c) of FIG. 3. Then, since the correction value VMtTrA of the motor speed target value is smaller than the previous value VMt (N−1) of the rotation speed in a period from the fourth timing t14 to the fifth timing t15, the command value VMtI is equal to the correction value VMtTrA of the motor speed target value. That is, the command value VMtI gradually decreases.

Then, at the fifth timing t15, the WC pressure Pwc inside the wheel cylinder 21 reaches the control fluid pressure target value PwcCTr and the correction value X is equal to "0". For that reason, the command value VMtI is maintained at "0" after the fifth timing t15. As a result, the driving of the electric motor 67 is stopped so that the brake fluid is not supplied from the pump 68.

In the embodiment, when the motor speed target value VMtTr (N) is smaller than the previous value VMt (N−1) of the rotation speed of the electric motor 67, the command value VMtI can be set to be larger than the motor speed target value VMtTr (N) in a range not larger than the previous value VMt (N−1) of the rotation speed. For that reason, it takes less time to increase the WC pressure Pwc inside the wheel cylinder 21 to the control fluid pressure target value PwcCTr by an amount that the brake fluid discharge amount of the pump 68 is corrected to increase as compared with a case in which the command value VMtI is set to be equal to the motor speed target value VMtTr (N).

Further, when the motor speed target value VMtTr (N) is smaller than the previous value VMt (N−1) of the rotation speed, it is possible to suppress an abrupt change in the command value VMtI as compared with a case in which the previous value VMt (N−1) of the rotation speed is not set to the upper-limit. As a result, it is possible to suppress an abrupt change in the magnitude of the operation noise of the electric motor 67.

Thus, it is possible to prevent the occupant of the vehicle from easily feeling uncomfortable due to a change in the magnitude of the operation noise of the electric motor 67 while suppressing deterioration of controllability of the WC pressure Pwc inside the wheel cylinder 21.

Next, an operation at the time of increasing the WC pressure Pwc inside the wheel cylinder 21 and decreasing the WC pressure Pwc will be described along with an effect thereof with reference to FIG. 4. Additionally, in the example shown in FIG. 4, the opening degree command value of the differential pressure adjustment valve 62 is maintained at a constant value from a time point in which the braking control starts to a time point in which the WC pressure Pwc starts to decrease, but the opening degree command value is gradually increased at the time of decreasing the WC pressure Pwc.

As shown in parts (a), (b), and (c) of FIG. 4, when the braking control starts from the first timing t21, the control fluid pressure target value PwcCTr increases. Then, in the braking actuator 60, the operation of the pump 68, that is, the driving of the electric motor 67 is started and the opening degree command value of the differential pressure adjustment valve 62 is adjusted. In the example shown in FIG. 4, since the control fluid pressure target value PwcCTr increases in a period from the first timing t21 to the second timing t22, the change amount ΔFV of the required fluid amount is larger than "0". Then, the candidate value VMtTrF of the calculated motor speed target value is larger than the motor speed upper-limit value VMtL. As a result, the motor speed target value VMtTr is equal to the motor speed upper-limit value VMtL in a period from the first timing t21 to the second timing t22.

Additionally, since the rotation speed VMt of the electric motor 67 is lower than the motor speed target value VMtTr in a period from the first timing t21 to the second timing t22, the calculated value ΔVMt is larger than "0". Thus, the correction value X gradually increases.

Then, the control fluid pressure target value PwcCTr is maintained in a period from the second timing t22 to the third timing t23. Then, since the change amount ΔFV of the required fluid amount is equal to "0", the candidate value VMtTrF of the motor speed target value is also equal to "0". In this way, when the candidate value VMtTrF is smaller than the motor speed upper-limit value VMtL, the motor speed target value VMtTr is equal to the candidate value VMtTrF.

In the example shown in FIG. 4, since the correction value X is large in a period from the second timing t22 to the third timing t23, the correction value VMtTrA of the motor speed target value is equal to or larger than the previous value VMt (N−1) of the rotation speed of the electric motor 67. As a result, the command value VMtI is equal to the previous value VMt (N−1) of the rotation speed. Further, since the rotation speed VMt of the electric motor 67 is higher than the motor speed target value VMtTr in a period from the second timing t22 to the third timing t23, the calculated value ΔVMt has a negative value. As a result, as shown in (c) of FIG. 4, the correction value X gradually decreases.

Then, the control fluid pressure target value PwcCTr gradually decreases toward "0" in a period from the third timing t23 to the fifth timing t25. In this way, when the control fluid pressure target value PwcCTr decreases, the WC pressure Pwc inside the wheel cylinder 21 decreases. In this way, when the command value VMtI is set to be larger than the motor speed target value VMtTr at the time of decreasing the WC pressure Pwc, it is difficult to decrease the WC pressure Pwc by an amount that the brake fluid discharge amount of the pump 68 increases. Regarding this point, in the embodiment, when the control fluid pressure target value PwcCTr decreases as in a period from the third timing t23 to the fourth timing t24, the command value VMtI is set to be equal to not the correction value VMtTrA of the motor speed target value but the motor speed target value VMtTr even when the motor speed target value VMtTr is smaller than the previous value VMt (N−1) of the rotation speed of the electric motor 67. Accordingly, it is possible to suppress the difficulty of decreasing the WC pressure Pwc inside the wheel cylinder 21 by an amount that the excess of the brake fluid discharge amount of the pump 68 can be suppressed.

Further, it is possible to suppress an increase in power consumption of the electric motor 67 by an amount that the command value VMtI does not become larger than the motor speed target value VMtTr at the time of decreasing the WC pressure Pwc inside the wheel cylinder 21 in this way.

Additionally, the rotation speed VMt of the electric motor 67 is equal to "0" at the fourth timing t24 and the rotation speed VMt is maintained at "0" after the fourth timing t24. For that reason, the correction value X decreases in synchronization with a decrease in the rotation speed VMt in a period from the third timing t23 to the fourth timing t24, but is maintained after the fourth timing t24. Then, it is determined that the driving of the electric motor 67 is not required since the control fluid pressure target value PwcCTr is equal to "0" at the fifth timing t25. As a result, the correction value X is reset to "0".

Next, an operation at the time of increasing the WC pressure Pwc inside the wheel cylinder 21, maintaining the WC pressure Pwc, and further increasing the WC pressure Pwc will be described along with an effect thereof with reference to FIG. 5. Additionally, in the example shown in FIG. 5, the opening degree command value of the differential pressure adjustment valve 62 is maintained at a constant value at the time of controlling the control fluid pressure PwcC, that is, the WC pressure Pwc.

As shown in parts (a), (b), and (c) of FIG. 5, when the braking control starts from the first timing t31, the control fluid pressure target value PwcCTr increases. Then, in the braking actuator 60, the operation of the pump 68, that is, the driving of the electric motor 67 is started and the opening degree command value of the differential pressure adjustment valve 62 is adjusted. In the example shown in FIG. 5, since the control fluid pressure target value PwcCTr increases in a period from the first timing t31 to the second timing t32, the change amount ΔFV of the required fluid amount is larger than "0". Then, the candidate value VMtTrF of the calculated motor speed target value is larger than the motor speed upper-limit value VMtL. As a result, the motor speed target value VMtTr is equal to the motor speed upper-limit value VMtL in a period from the first timing t31 to the second timing t32.

Additionally, the rotation speed VMt of the electric motor 67 increases toward the motor speed target value VMtTr in a period from the first timing t31 to the second timing t32. For that reason, the calculated value ΔVMt is larger than "0" in that period. Thus, the correction value X gradually increases.

Then, the control fluid pressure target value PwcCTr is maintained in a period from the second timing t32 to the fourth timing t34. In this case, since the change amount ΔFV of the required fluid amount is equal to "0", the candidate value VMtTrF of the motor speed target value is maintained at "0". In this way, when the candidate value VMtTrF is smaller than the motor speed upper-limit value VMtL, the motor speed target value VMtTr is set to be equal to the candidate value VMtTrF.

In a period from the second timing t32 to the fourth timing t34, the motor speed target value VMtTr (N) is smaller than the previous value VMt (N−1) of the rotation speed of the electric motor 67 and the control fluid pressure target value PwcCTr does not decrease. Further, in a period from the second timing t32 to the third timing t33, the correction value VMtTrA of the motor speed target value which is a sum obtained by adding the correction value X (N) to the motor speed target value VMtTr (N) is larger than the previous value VMt (N−1) of the rotation speed. For that reason, the command value VMtI is equal to the previous value VMt (N−1) of the rotation speed in a period from the second timing t32 to the third timing t33.

However, since the correction value X is small in a period from the third timing t33 to the fourth timing t34, the correction value VMtTrA of the motor speed target value is equal to or smaller than the previous value VMt (N−1) of the rotation speed of the electric motor 67. For that reason, the command value VMtI is equal to the correction value VMtTrA of the motor speed target value in that period. In the example shown in FIG. 5, since the correction value VMtTrA of the motor speed target value gradually decreases in that period, the command value VMtI also gradually decreases.

Then, the control fluid pressure target value PwcCTr increases again after the fourth timing t34. Then, since the change amount ΔFV of the required fluid amount is larger than "0", the candidate value VMtTrF of the motor speed target value is larger than "0". In the example shown in FIG. 5, the candidate value VMtTrF is not larger than the motor speed upper-limit value VMtL.

In addition, the motor speed target value VMtTr (N) is equal to or larger than the previous value VMt (N−1) of the rotation speed of the electric motor 67 after the fourth timing t34. For that reason, the command value VMtI is set to be equal to the motor speed target value VMtTr (N).

That is, when the motor speed target value VMtTr (N) is equal to or larger than the previous value VMt (N−1) of the rotation speed of the electric motor 67, there is concern that a deviation between the WC pressure Pwc inside the wheel cylinder 21 and the control fluid pressure target value PwcCTr may increase in a case in which the brake fluid discharge amount of the pump 68 is not increased. For that reason, in the embodiment, when the motor speed target value VMtTr (N) is equal to or larger than the previous value VMt (N−1) of the rotation speed of the electric motor 67, the command value VMtI is set to be equal to the motor speed target value VMtTr. In this case, since the command value VMtI can be set to a value larger than the previous value VMt (N−1) of the rotation speed, it is possible to increase the WC pressure Pwc inside the wheel cylinder 21 at an early timing by an amount that an increase in the brake fluid discharge amount of the pump 68 is not limited. Thus, it is possible to suppress an increase in the deviation between the WC pressure Pwc inside the wheel cylinder 21 and the control fluid pressure target value PwcCTr.

Additionally, the above-described embodiment may be modified into other embodiments as below.

When the motor speed target value VMtTr (N) is smaller than the previous value VMt (N−1) of the rotation speed of the electric motor 67, the command value VMtI may be set to be larger than the motor speed target value VMtTr (N) in a range not larger than the previous value VMt (N−1) of the rotation speed even when the control fluid pressure target value PwcCTr decreases. For example, a smaller value of the previous value VMt (N−1) of the rotation speed and the correction value VMtTrA of the motor speed target value may be set to the command value VMtI. In this case, the power consumption of the electric motor 67 slightly increases as compared with the case of the above-described embodiment, but a delay of a decrease in the WC pressure Pwc inside the wheel cylinder 21 can be suppressed by increasing the opening degree command value of the differential pressure adjustment valve 62.

When the motor speed target value VMtTr is equal to or larger than the previous value VMt (N−1) of the rotation speed of the electric motor 67, the command value VMtI may be set to be equal to a smaller value of the motor speed upper-limit value VMtL and a sum obtained by adding the correction value X (N) to the motor speed target value VMtTr in a case in which the correction value X (N) is larger than "0".

In the difference calculation unit 106, a difference obtained by subtracting the WC pressure Pwc inside the wheel cylinder 21 from the control fluid pressure target value PwcCTr may be derived as the fluid pressure difference calculated value. In this case, the WC pressure Pwc used for calculating the fluid pressure difference calculated value corresponds to an example of the "actual value of the WC pressure". Further, in the difference calculation unit 106, a difference obtained by subtracting a value in which the WC pressure Pwc is converted into a fluid amount from a value in which the control fluid pressure target value PwcCTr is converted into a fluid amount may be derived as the fluid amount difference calculated value. In such a case, in the difference calculation unit 106, it is preferable to derive the calculated value ΔVMt (N) by performing a conversion process of converting the fluid pressure difference calculated value or the fluid amount difference calculated value into the rotation speed of the electric motor 67. In this way, even when the calculated value ΔVMt (N) is calculated, it is possible to obtain the same operation and effect as those of the above-described embodiment.

Second Embodiment

Next, a second embodiment of the braking control device for the vehicle will be described with reference to FIGS. 3 to 7. In the second embodiment, a method of setting the motor speed command value VMtI which is the command value for the rotation speed VMt of the electric motor 67 is different from that of the first embodiment. Here, in the description below, a difference from the first embodiment will be chiefly described, the same or corresponding components as or to those of the first embodiment are denoted by the same reference numerals, and a redundant description thereof will be omitted.

FIG. 6 illustrates a control device 100A of the embodiment and a braking actuator 60 operated by the control device 100A. Similarly to the first embodiment, the braking actuator 60 includes a pump 68, an electric motor 67 which is a power source of the pump 68, and a differential pressure adjustment valve 62.

As illustrated in FIG. 6, the control device 100A includes a fluid pressure estimation unit 111, a fluid pressure target calculation unit 112, a motor speed calculation unit 113, a pump discharge amount calculation unit 114, a pump target calculation unit 115, a difference calculation unit 116, an integration unit 117, an upper-limit setting unit 118, a pump command value deriving unit 119, and a fluid pressure control unit 120 as function units for driving the electric motor 67, that is, controlling the brake fluid discharge amount of the pump 68.

Similarly to the fluid pressure estimation unit 101 of the first embodiment, the fluid pressure estimation unit 111 estimates and calculates the WC pressure Pwc inside each wheel cylinder 21. Further, the fluid pressure estimation unit 111 also calculates the control fluid pressure PwcC similarly to the fluid pressure estimation unit 101 of the first embodiment.

Similarly to the fluid pressure target calculation unit 102 of the first embodiment, the fluid pressure target calculation unit 112 calculates the control fluid pressure target value PwcCTr. The control fluid pressure target value PwcCTr is an example of the "fluid pressure target value" which is the target value for the WC pressure Pwc inside the wheel cylinder 21.

Similarly to the motor speed calculation unit 103 of the first embodiment, the motor speed calculation unit 113 calculates the rotation speed VMt of the electric motor 67.

The pump discharge amount calculation unit 114 calculates the pump discharge amount Sp which is the brake fluid discharge amount per unit time of the pump 68 on the basis of the rotation speed VMt of the electric motor 67 calculated by the motor speed calculation unit 113. There is a corresponding relationship between the rotation speed VMt of the electric motor 67 and the pump discharge amount Sp. For that reason, the pump discharge amount calculation unit 114 calculates the pump discharge amount Sp so that the pump discharge amount Sp increases as the rotation speed VMt increases. In the embodiment, the pump discharge amount Sp calculated by the pump discharge amount calculation unit 114 corresponds to an example of the "actual value of the pump discharge amount".

Additionally, when a sensor capable of detecting the pump discharge amount is provided in the braking actuator 60, a detection value detected on the basis of the signal from the sensor may be used as the pump discharge amount Sp.

The pump target calculation unit 115 calculates the pump discharge amount target value SpTr which is the target value of the pump discharge amount Sp corresponding to the brake fluid discharge amount per unit time of the pump 68. That is, more brake fluid needs to flow into the wheel cylinder 21 as the increase amount of the control fluid pressure PwcC calculated by the fluid pressure estimation unit 111 increases. For that reason, the pump target calculation unit 115 calculates the pump discharge amount target value SpTr so that the pump discharge amount target value SpTr increases as the increase amount of the control fluid pressure PwcC increases.

The difference calculation unit 116 derives a calculated value ΔSp which is a difference obtained by subtracting the pump discharge amount Sp calculated by the pump discharge amount calculation unit 114 from the pump discharge amount target value SpTr calculated by the pump target calculation unit 115.

The integration unit 117 derives the correction value Z which is a value obtained by integrating the calculated value ΔSp calculated by the difference calculation unit 116.

The upper-limit setting unit 118 calculates the pump discharge amount upper-limit value SpL which is the upper-limit value of the pump discharge amount Sp in response to the type of braking control to be performed. Specifically, when the high urgent braking control is performed as described above, the upper-limit setting unit 118 sets the pump discharge amount upper-limit value SpL to be relatively large. Meanwhile, when the low urgent braking control is performed as described above, the upper-limit setting unit 118 sets the pump discharge amount upper-limit value SpL to a small value as compared with a case in which the high urgent braking control is performed.

The pump command value deriving unit 119 derives a pump discharge amount command value SpI which is a command value for the pump discharge amount Sp on the basis of the pump discharge amount target value SpTr calculated by the pump target calculation unit 115 and the calculated value ΔSp derived by the difference calculation unit 116 (specifically, the correction value Z derived by the integration unit 117).

The fluid pressure control unit 120 derives the motor speed command value VMtI which is a command value for the rotation speed VMt of the electric motor 67 on the basis of the pump discharge amount command value SpI derived by the pump command value deriving unit 119. Then, the fluid pressure control unit 120 controls the WC pressure Pwc inside the wheel cylinder 21, that is, the control fluid pressure PwcC by driving the electric motor 67 on the basis of the derived motor speed command value VMtI.

Next, a process routine which is performed by the control device 100A in order to drive the electric motor 67 when performing the braking control will be described with reference to FIG. 7. This process routine is performed every predetermined control cycle during the braking control.

As illustrated in FIG. 7, in this process routine, in the first step S111, the count number N is incremented by "1". This count number N is reset to "0" when the braking control ends and this process routine is not performed. Then, in the next step S112, the rotation speed VMt (N) of the electric motor 67 is calculated by the motor speed calculation unit 113. Next, in step S113, the pump discharge amount Sp (N) is calculated on the basis of the rotation speed VMt (N) calculated in step S112 by the pump discharge amount calculation unit 114. Then, in the next step S114, the control fluid pressure target value PwcCTr (N) calculated by the fluid pressure target calculation unit 112 is acquired. In addition, the control fluid pressure target value PwcCTr is calculated at the same control cycle as that of this process routine.

Next, in step S115, the control fluid pressure target value PwcCTr (N) is converted into the required fluid amount FV (N) by the pump target calculation unit 115. The required fluid amount FV (N) increases as the control fluid pressure target value PwcCTr increases. Then, in the next step S116, the change amount ΔFV of the required fluid amount FV is calculated by the pump target calculation unit 115. That is, the pump target calculation unit 115 sets a difference obtained by subtracting the previous value FV (N−1) of the required fluid amount from the required fluid amount FV (N) derived in step S115 as the change amount ΔFV.

Next, in step S117, the pump discharge amount upper-limit value SpL set by the upper-limit setting unit 118 is acquired by the pump target calculation unit 115. Then, in the next step S118, the pump discharge amount target value SpTr (N) is calculated by the pump target calculation unit 115. That is, the pump target calculation unit 115 calculates a candidate value SpTrF of the pump discharge amount target value SpTr by the same calculation method as that of the target value SpTr of the pump discharge amount in step S16 of the first embodiment. Then, the pump target calculation unit 115 sets a smaller value of the pump discharge amount upper-limit value SpL acquired in step S117 and the candidate value SpTrF of the pump discharge amount target value as the pump discharge amount target value SpTr (N). Additionally, the candidate value SpTrF of the pump discharge amount target value is a value corresponding to the change amount ΔFV of the required fluid amount which is the change amount of the control fluid pressure target value PwcCTr as described above. Thus, when the candidate value SpTrF of the pump discharge amount target value is equal to or smaller than the pump discharge amount upper-limit value SpL, the pump target calculation unit 115 can calculate the pump discharge amount target value SpTr (N) so that the pump discharge amount target value SpTr (N) increases as the change amount ΔFV of the required fluid amount increases, that is, the increase amount of the control fluid pressure target value PwcCTr increases.

Then, in the next step S119, it is determined whether the driving of the electric motor 67 is required. When the driving is required (step S119: YES), the process proceeds to the next step S120. In the next step S120, the calculated value ΔSp (N) which is a difference obtained by subtracting the previous value Sp (N−1) of the pump discharge amount from the previous value SpTr (N−1) of the pump discharge amount target value is derived by the difference calculation unit 116. The previous value SpTr (N−1) of the pump discharge amount target value is the derived pump discharge amount target value SpTr when this process routine is performed at a previous time. Further, the previous value Sp (N−1) of the pump discharge amount is the pump discharge amount Sp when this process routine is performed at a previous time. Next, in step S121, a sum obtained by adding the calculated value ΔSp (N) to the previous value Z (N−1) of the correction value by the integration unit 117 is set as a correction value Z (N). That is, in step S121, the calculated value ΔSp is integrated. Then, the process proceeds to step S124 to be described later.

Meanwhile, in step S119, when the driving of the electric motor 67 is not required (NO), the process proceeds to the next step S122. In the next step S122, the calculated value ΔSp (N) is set to be equal to "0". Next, in step S123, the correction value Z (N) is set to be equal to "0". Then, the process proceeds to the next step S124.

In step S124, the correction value SpTrA of the pump discharge amount target value is calculated by the pump command value deriving unit 119. That is, the pump command value deriving unit 119 sets the correction value SpTrA of the pump discharge amount target value to be equal to the sum of the pump discharge amount target value SpTr (N) derived in step S118 and the correction value Z (N) derived in step S121 or step S123. Next, in step S125, it is determined whether the pump discharge amount target value SpTr (N) calculated in step S118 is smaller than the previous value Sp (N−1) of the pump discharge amount by the pump command value deriving unit 119. When the pump discharge amount target value SpTr (N) is equal to or larger than the previous value Sp (N−1) of the pump discharge amount (step S125: NO), the process proceeds to step S128 to be described later. Meanwhile, when the pump discharge amount target value SpTr (N) is smaller than the previous value Sp (N−1) of the pump discharge amount (step S125: YES), the process proceeds to the next step S126.

In step S126, it is determined whether the control fluid pressure target value PwcCTr (N) acquired in step S114 is equal to or larger than the previous value PwcCTr (N−1) of the control fluid pressure target value by the pump command value deriving unit 119. When the control fluid pressure target value PwcCTr (N) is equal to or larger than the previous value PwcCTr (N−1) of the control fluid pressure target value (step S126: YES), the process proceeds to the next step S127. Then, in step S127, the pump discharge amount command value SpI is derived by the pump command value deriving unit 119. That is, the pump command value deriving unit 119 sets a smaller value of the previous value Sp (N−1) of the pump discharge amount and the correction value SpTrA of the pump discharge amount target value derived in step S124 as the pump discharge amount command value SpI. Then, the process proceeds to step S129 to be described later.

Meanwhile, in step S126, when the control fluid pressure target value PwcCTr (N) is smaller than the previous value PwcCTr (N−1) of the control fluid pressure target value (NO), the process proceeds to the next step S128.

Then, in step S128, the pump discharge amount command value SpI is set to be equal to the pump discharge amount target value SpTr (N) calculated in step S118 by the pump command value deriving unit 119. Then, the process proceeds to the next step S129.

In step S129, the motor speed command value VMtI is derived by the fluid pressure control unit 120. As the rotation speed VMt of the electric motor 67 increases, the pump discharge amount Sp increases. For that reason, the fluid pressure control unit 120 derives the motor speed command value VMtI so that the motor speed command value VMtI increases as the pump discharge amount command value SpI derived in step S127 or step S128 increases. Then, in the next step S130, the driving of the electric motor 67 is controlled on the basis of the motor speed command value VMtI derived in step S129 by the fluid pressure control unit 120. Subsequently, this process routine temporarily ends.

Next, as shown in FIG. 3, an operation at the time of increasing the WC pressure Pwc inside the wheel cylinder 21 and maintaining the WC pressure Pwc will be described along with an effect thereof. Additionally, in the example described herein, the opening degree command value of the differential pressure adjustment valve 62 is maintained at a constant value at the time of controlling the control fluid pressure PwcC, that is, the WC pressure Pwc.

When the braking control starts from the first timing t11 shown in FIG. 3, the control fluid pressure target value PwcCTr increases. Then, in the braking actuator 60, the operation of the pump 68, that is, the driving of the electric motor 67 is started and the opening degree command value of the differential pressure adjustment valve 62 is adjusted. In a period in which the control fluid pressure target value PwcCTr increases as in a period from the first timing t11 to the third timing t13 shown in FIG. 3, the change amount ΔFV of the required fluid amount is larger than "0". For that reason, the candidate value SpTrF of the calculated pump discharge amount target value increases. In the example described herein, the candidate value SpTrF is larger than the pump discharge amount upper-limit value SpL. As a result, the pump discharge amount target value SpTr is equal to the pump discharge amount upper-limit value SpL in a period in which the control fluid pressure target value PwcCTr increases. In that period, since the pump discharge amount target value SpTr (N) is not smaller than the previous value Sp (N−1) of the pump discharge amount, the pump discharge amount command value SpI is maintained at the pump discharge amount target value SpTr. Then, the driving of the electric motor 67 is controlled on the basis of the motor speed command value VMtI in accordance with the pump discharge amount command value SpI.

Additionally, the pump discharge amount Sp increases toward the pump discharge amount target value SpTr in a period in which the control fluid pressure target value PwcCTr increases. In that period, the calculated value ΔSp is larger than "0" in a period in which the pump discharge amount Sp is smaller than the pump discharge amount target value SpTr as in a period from the first timing t11 to the second timing t12 shown in FIG. 3. For that reason, the correction value Z which is an integrated value of the calculated value ΔSp gradually increases.

Then, when the control fluid pressure target value PwcCTr is maintained after the third timing t13 shown in FIG. 3, since the change amount ΔFV of the required fluid amount is equal to "0", the candidate value SpTrF of the pump discharge amount target value is also equal to "0". Then, when the candidate value SpTrF is smaller than the pump discharge amount upper-limit value SpL, the pump discharge amount target value SpTr is equal to the candidate value SpTrF.

In a period corresponding to a period from the third timing t13 to the fifth timing t15 shown in FIG. 3, the pump discharge amount target value SpTr (N) is smaller than the previous value Sp (N−1) of the pump discharge amount. Further, the control fluid pressure target value PwcCTr does not decrease. Thus, a smaller value of the previous value Sp (N−1) of the pump discharge amount and the correction value SpTrA of the pump discharge amount target value which is a sum obtained by adding the correction value Z (N) to the pump discharge amount target value SpTr (N) is derived as the pump discharge amount command value SpI. That is, the previous value Sp (N−1) of the pump discharge amount is set to the upper-limit of the pump discharge amount command value and the pump discharge amount command value SpI is derived so that the pump discharge amount command value SpI increases as the pump discharge amount target value SpTr (N) increases and the pump discharge amount command value SpI increases as the calculated value ΔSp (N) increases. Then, the driving of the electric motor 67 is controlled on the basis of the motor speed command value VMtI in accordance with the pump discharge amount command value SpI derived in this way.

Additionally, the correction value SpTrA of the pump discharge amount target value is equal to or larger than the previous value Sp (N−1) of the pump discharge amount in a period in which the correction value Z is large. As a result, the pump discharge amount command value SpI is set to be equal to the previous value Sp (N−1) of the pump discharge amount. In this way, when the pump discharge amount command value SpI is set to be equal to the previous value Sp (N−1) of the pump discharge amount and the driving of the electric motor 67 is controlled on the basis of the motor speed command value VMtI in accordance with the pump discharge amount command value SpI, the correction value Z gradually decreases. Then, when the correction value Z decreases so that the correction value SpTrA of the pump discharge amount target value is smaller than the previous value Sp (N−1) of the pump discharge amount, the pump discharge amount command value SpI is equal to the correction value SpTrA of the pump discharge amount target value. Thus, when the correction value Z continuously decreases, the pump discharge amount command value SpI and the motor speed command value VMtI respectively continuously decrease.

Then, when the WC pressure Pwc inside the wheel cylinder 21 reaches the control fluid pressure target value PwcCTr and the correction value Z is equal to "0", the pump discharge amount command value SpI and the motor speed command value VMtI are respectively maintained at "0" from that time. As a result, the driving of the electric motor 67 is stopped so that the brake fluid is not supplied from the pump 68.

In the embodiment, when the pump discharge amount target value SpTr (N) is smaller than the previous value Sp (N−1) of the pump discharge amount, the pump discharge amount command value SpI can be set to be larger than the pump discharge amount target value SpTr (N) in a range not larger than the previous value Sp (N−1) of the pump discharge amount. For that reason, it takes less time to increase the WC pressure Pwc inside the wheel cylinder 21 to the control fluid pressure target value PwcCTr by an amount that the brake fluid discharge amount of the pump 68 can be corrected to increase by driving the electric motor 67 on the basis of the motor speed command value VMtI corresponding to the pump discharge amount command value SpI as compared with a case in which the pump discharge amount command value SpI is set to be equal to the pump discharge amount target value SpTr (N).

Further, when the pump discharge amount target value SpTr (N) is smaller than the previous value Sp (N−1) of the pump discharge amount, it is possible to suppress an abrupt increase in the pump discharge amount command value SpI and the motor speed command value VMtI as compared with a case in which the previous value Sp (N−1) of the pump discharge amount is not set to the upper-limit. As a result, it is possible to suppress an abrupt change in the magnitude of the operation noise of the electric motor 67 and the pump 68.

Thus, it is possible to prevent the occupant of the vehicle from easily feeling uncomfortable due to a change in the magnitude of the operation noise of the electric motor 67 and the pump 68 while suppressing deterioration of controllability of the WC pressure Pwc inside the wheel cylinder 21.

Next, as shown in FIG. 4, an operation at the time of increasing the WC pressure Pwc inside the wheel cylinder 21 and decreasing the WC pressure Pwc will be described along with an effect thereof. In addition, in the example described herein, the opening degree command value of the differential pressure adjustment valve 62 is maintained at a constant value from a time point in which the braking control starts to a time point in which the WC pressure Pwc starts to decrease. However, the opening degree command value is gradually increased at the time of decreasing the WC pressure Pwc.

When the braking control starts from the first timing t21 shown in FIG. 4, the control fluid pressure target value PwcCTr increases. Then, in the braking actuator 60, the operation of the pump 68, that is, the driving of the electric motor 67 is started and the opening degree command value of the differential pressure adjustment valve 62 is adjusted. In the example shown herein, the change amount ΔFV of the required fluid amount is larger than "0" and the candidate value SpTrF of the calculated pump discharge amount target value is larger than the pump discharge amount upper-limit value SpL in a period in which the control fluid pressure target value PwcCTr increases. As a result, the pump discharge amount target value SpTr is equal to the pump discharge amount upper-limit value SpL in a period in which the control fluid pressure target value PwcCTr increases. For that reason, the pump discharge amount command value SpI is equal to the pump discharge amount upper-limit value SpL. Then, the driving of the electric motor 67 is controlled on the basis of the motor speed command value VMtI in accordance with the pump discharge amount command value SpI.

Additionally, since the pump discharge amount Sp is smaller than the pump discharge amount target value SpTr in a period in which the control fluid pressure target value PwcCTr increases, the calculated value ΔSp is larger than "0". Thus, the correction value Z gradually increases.

When the control fluid pressure target value PwcCTr is maintained as in a period from the second timing t22 to the third timing t23 shown in FIG. 4, since the change amount ΔFV of the required fluid amount is equal to "0", the candidate value SpTrF of the pump discharge amount target value is also equal to "0". In this way, when the candidate value SpTrF is smaller than the pump discharge amount upper-limit value SpL, the pump discharge amount target value SpTr is equal to the candidate value SpTrF.

In the example shown herein, the correction value SpTrA of the pump discharge amount target value is equal to or larger than the previous value Sp (N−1) of the pump discharge amount in a period in which the correction value Z is large. As a result, the pump discharge amount command value SpI is equal to the previous value Sp (N−1) of the pump discharge amount. Further, in the example shown herein, since the pump discharge amount Sp is larger than the pump discharge amount target value SpTr in a period in which the control fluid pressure target value PwcCTr is maintained and the correction value Z is large, the calculated value ΔSp has a negative value. As a result, the correction value Z gradually decreases.

Then, the WC pressure Pwc inside the wheel cylinder 21 decreases in a period in which the control fluid pressure target value PwcCTr gradually decreases toward "0". In this way, when the pump discharge amount command value SpI is set to be larger than the pump discharge amount target value SpTr at the time of decreasing the WC pressure Pwc and the electric motor 67 is driven on the basis of the motor speed command value VMtI corresponding to the pump discharge amount command value SpI, it is difficult to decrease the WC pressure Pwc as the brake fluid discharge amount of the pump 68 increases. Regarding this point, in the embodiment, even when the pump discharge amount target value SpTr is smaller than the previous value Sp (N−1) of the pump discharge amount in a period in which the control fluid pressure target value PwcCTr decreases, the pump discharge amount command value SpI is set to be equal to not the correction value SpTrA of the pump discharge amount target value but the pump discharge amount target value SpTr. Then, the driving of the electric motor 67 is controlled on the basis of the motor speed command value VMtI in accordance with the pump discharge amount command value SpI. Accordingly, it is possible to suppress the difficulty of decreasing the WC pressure Pwc inside the wheel cylinder 21 by an amount that the excess of the brake fluid discharge amount of the pump 68 can be suppressed.

Further, it is possible to suppress an increase in the motor speed command value VMtI by an amount that the pump discharge amount command value SpI does not become larger than the pump discharge amount target value SpTr at the time of decreasing the WC pressure Pwc inside the wheel cylinder 21 in this way. For that reason, it is possible to suppress an increase in power consumption of the electric motor 67.

In addition, when the pump discharge amount Sp is maintained at "0", since the calculated value ΔSp is "0" in a period in which the WC pressure Pwc inside the wheel cylinder 21 still decreases, the correction value Z is maintained at a value at a timing in which the pump discharge amount Sp reaches "0". Then, when it is determined that the driving of the electric motor 67 is not required since the control fluid pressure target value PwcCTr is equal to "0", the correction value Z is reset to "0".

Next, as shown in FIG. 5, an operation at the time of increasing the WC pressure Pwc inside the wheel cylinder 21, maintaining the WC pressure Pwc, and further increasing the WC pressure Pwc will be described along with an effect thereof. Additionally, in the example described herein, the opening degree command value of the differential pressure adjustment valve 62 is maintained at a constant value at the time of controlling the control fluid pressure PwcC, that is, the WC pressure Pwc.

When the braking control starts from the first timing t31 shown in FIG. 5, the control fluid pressure target value PwcCTr increases. Then, in the braking actuator 60, the operation of the pump 68, that is, the driving of the electric motor 67 is started and the opening degree command value of the differential pressure adjustment valve 62 is adjusted. In a period in which the control fluid pressure target value PwcCTr increases as in a period from the first timing t31 to the second timing t32 shown in FIG. 5, the change amount ΔFV of the required fluid amount is larger than "0". Then, the candidate value SpTrF of the calculated pump discharge amount target value is larger than the pump discharge amount upper-limit value SpL. As a result, since the pump discharge amount target value SpTr is equal to the pump discharge amount upper-limit value SpL in that period, the pump discharge amount command value SpI is equal to the pump discharge amount upper-limit value SpL. Then, the driving of the electric motor 67 is controlled on the basis of the motor speed command value VMtI in accordance with the pump discharge amount command value SpI.

In addition, since the pump discharge amount Sp is smaller than the pump discharge amount target value SpTr in a period in which the control fluid pressure target value PwcCTr increases, the calculated value ΔSp is larger than "0". Thus, the correction value Z gradually increases.

When the control fluid pressure target value PwcCTr is maintained as in a period from the second timing t32 to the fourth timing t34 shown in FIG. 5, since the change amount ΔFV of the required fluid amount is equal to "0", the candidate value SpTrF of the pump discharge amount target value is maintained at "0". In this way, when the candidate value SpTrF is smaller than the pump discharge amount upper-limit value SpL, the pump discharge amount target value SpTr is set to be equal to the candidate value SpTrF.

Further, in a period in which the control fluid pressure target value PwcCTr is maintained, the pump discharge amount target value SpTr (N) is smaller than the previous value Sp (N−1) of the pump discharge amount and the control fluid pressure target value PwcCTr does not decrease. In that period, when the correction value SpTrA of the pump discharge amount target value which is a sum obtained by adding the correction value Z (N) to the pump discharge amount target value SpTr (N) is larger than the previous value Sp (N−1) of the pump discharge amount, the pump discharge amount command value SpI is equal to the previous value Sp (N−1) of the pump discharge amount. Then, the driving of the electric motor 67 is controlled on the basis of the motor speed command value VMtI in accordance with the pump discharge amount command value SpI.

However, the correction value SpTrA of the pump discharge amount target value is equal to or smaller than the previous value Sp (N−1) of the pump discharge amount when the correction value Z decreases even in a period in which the control fluid pressure target value PwcCTr is maintained. Then, the pump discharge amount command value SpI is equal to the correction value SpTrA of the pump discharge amount target value. At this time, when the correction value SpTrA of the pump discharge amount target value gradually decreases, the pump discharge amount command value SpI and the motor speed command value VMtI also gradually decrease. As a result, the pump discharge amount Sp also gradually decreases.

In this way, since the change amount ΔFV of the required fluid amount is larger than "0" in a case in which the control fluid pressure target value PwcCTr increases again when the pump discharge amount Sp decreases, the candidate value SpTrF of the pump discharge amount target value becomes larger than "0". At this time, when the candidate value SpTrF is not larger than the motor speed upper-limit value VMtL, the pump discharge amount target value SpTr is equal to the candidate value SpTrF.

Further, when the control fluid pressure target value PwcCTr increases, the pump discharge amount target value SpTr (N) is equal to or larger than the previous value Sp (N−1) of the pump discharge amount. For that reason, the pump discharge amount command value SpI is set to be equal to the pump discharge amount target value SpTr. Then, the driving of the electric motor 67 is controlled on the basis of the motor speed command value VMtI in accordance with the pump discharge amount command value SpI. As a result, the pump discharge amount Sp gradually increases.

That is, when the pump discharge amount target value SpTr (N) is equal to or larger than the previous value Sp (N−1) of the pump discharge amount, there is concern that a deviation between the WC pressure Pwc inside the wheel cylinder 21 and the control fluid pressure target value PwcCTr may increase in a case in which the brake fluid discharge amount of the pump 68 is not increased. For that reason, in the embodiment, when the pump discharge amount target value SpTr (N) is equal to or larger than the previous value Sp (N−1) of the pump discharge amount, the pump discharge amount command value SpI is set to be equal to the motor speed target value VMtTr. In this case, the pump discharge amount command value SpI can be set to a value larger than the previous value Sp (N−1) of the pump discharge amount. When the electric motor 67 is driven on the basis of the motor speed command value VMtI corresponding to the pump discharge amount command value SpI, since an increase in the brake fluid discharge amount of the pump 68 is not limited, it is possible to increase the WC pressure Pwc inside the wheel cylinder 21 at an early timing. Thus, it is possible to suppress an increase in the deviation between the WC pressure Pwc inside the wheel cylinder 21 and the control fluid pressure target value PwcCTr.

Additionally, the above-described embodiment may be modified into other embodiments as below.

When the pump discharge amount target value SpTr (N) is smaller than the previous value Sp (N−1) of the pump discharge amount, the pump discharge amount command value SpI may be set to be larger than the pump discharge amount target value SpTr (N) in a range not larger than the previous value Sp (N−1) of the pump discharge amount even when the control fluid pressure target value PwcCTr decreases. For example, a smaller value of the previous value Sp (N−1) of the pump discharge amount and the correction value SpTrA of the pump discharge amount target value may be set as the pump discharge amount command value SpI. When the electric motor 67 is driven on the basis of the motor speed command value VMtI corresponding to the pump discharge amount command value SpI, the power consumption of the electric motor 67 slightly increases as compared with the case of the above-described embodiment, but a delay of a decrease in the WC pressure Pwc inside the wheel cylinder 21 can be suppressed by increasing the opening degree command value of the differential pressure adjustment valve 62.

In a case in which the correction value Z (N) is larger than "0" when the pump discharge amount target value SpTr is equal to or larger than the previous value Sp (N−1) of the pump discharge amount, the pump discharge amount command value SpI may be set to be equal to a smaller value of the pump discharge amount upper-limit value SpL and a sum obtained by adding the correction value Z (N) to the pump discharge amount target value SpTr.

In the difference calculation unit 116, a difference obtained by subtracting the WC pressure Pwc inside the wheel cylinder 21 from the control fluid pressure target value PwcCTr may be derived as the fluid pressure difference calculated value. In this case, the WC pressure Pwc used for calculating the fluid pressure difference calculated value corresponds to an example of the "actual value of the WC pressure". Further, in the difference calculation unit 116, a difference obtained by subtracting a value in which the WC pressure Pwc is converted into a fluid amount from a value in which the control fluid pressure target value PwcCTr is converted into a fluid amount may be derived as the fluid amount difference calculated value. In such a case, in the difference calculation unit 116, it is preferable to derive the calculated value ΔSp (N) by performing a conversion process of converting the fluid pressure difference calculated value or the fluid amount difference calculated value into the pump discharge amount. In this way, even when the calculated value ΔSp (N) is calculated, it is possible to obtain the same operation and effect as those of the above-described embodiment.

Next, technical ideas that can be understood from the above-described embodiments and other embodiments will be additionally described below.

(A) An integration unit may be provided so as to integrate the calculated values derived by the difference calculation unit.

When the motor speed target value calculated by the motor target calculation unit is smaller than the previous value of the actual value of the rotation speed of the electric motor, the fluid pressure control unit may preferably set a smaller value of the previous value of the actual value of the rotation speed of the electric motor and the sum of the integrated value of the calculated value calculated by the integration unit and the motor speed target value as the command value.

(B) An upper-limit setting unit may be provided so as to set a motor speed upper-limit value corresponding to an upper-limit value of the rotation speed of the electric motor in response to the type of braking control to be performed.

The target value calculation unit may preferably set a smaller value of the rotation speed corresponding to the increase amount of the fluid pressure target value and the set motor speed upper-limit value as the motor speed target value.

(C) When the pump discharge amount target value calculated by the pump target calculation unit is equal to or larger than the previous value of the actual value of the brake fluid discharge amount of the pump, the pump command value deriving unit may preferably set the pump discharge amount command value to be equal to the pump discharge amount target value.

(D) The pump command value deriving unit may preferably set the pump discharge amount command value to be equal to the pump discharge amount target value on the condition that the fluid pressure target value decreases even when the pump discharge amount target value calculated by the pump target calculation unit is smaller than the previous value of the actual value of the brake fluid discharge amount of the pump.

(E) An integration unit may be provided so as to integrate the calculated values derived by the difference calculation unit.

When the pump discharge amount target value calculated by the pump target calculation unit is smaller than the previous value of the actual value of the pump discharge amount, the pump command value deriving unit may preferably set a smaller value of the previous value of the actual value of the pump discharge amount and the sum of the integrated value of the calculated value calculated by the integration unit and the pump discharge amount target value as the pump discharge amount command value.

(F) An upper-limit setting unit may be provided so as to set a pump discharge amount upper-limit value corresponding to an upper-limit value of the pump discharge amount in response to the type of braking control to be performed.

The pump target calculation unit may preferably set a smaller value of the pump discharge amount corresponding to the increase amount of the fluid pressure target value and the set pump discharge amount upper-limit value as the pump discharge amount target value.

The invention claimed is:

1. A braking control device for a vehicle applied to a braking device of a vehicle including a pump for supplying a brake fluid to a wheel cylinder provided for a vehicle wheel and an electric motor corresponding to a power source of the pump, comprising:
a fluid pressure control unit which controls a fluid pressure inside the wheel cylinder by driving the electric motor on the basis of a command value for a rotation speed of the electric motor every predetermined control cycle;
a motor target calculation unit which calculates a motor speed target value corresponding to a target value of the rotation speed of the electric motor every control cycle so that the motor speed target value increases as an increase amount of a fluid pressure target value corresponding to a target value of the fluid pressure inside the wheel cylinder increases; and
a difference calculation unit which derives a calculated value that is a value corresponding to a difference obtained by subtracting an actual value of one of the rotation speed of the electric motor and the fluid pressure inside the wheel cylinder from a target value thereof every control cycle, wherein
when the motor speed target value calculated by the motor target calculation unit is smaller than a previous value of the actual value of the rotation speed of the electric motor, the fluid pressure control unit sets the previous value of the actual value of the rotation speed of the electric motor as an upper-limit of the command value and derives the command value so that the command value increases as the motor speed target value increases and the command value increases as the calculated value derived by the difference calculation unit increases.

2. The braking control device for the vehicle according to claim 1, wherein
when the motor speed target value calculated by the motor target calculation unit is equal to or larger than the previous value of the actual value of the rotation speed of the electric motor, the fluid pressure control unit sets the command value to be equal to the motor speed target value.

3. The braking control device for the vehicle according to claim 1, wherein
the fluid pressure control unit sets the command value to be equal to the motor speed target value on condition that the fluid pressure target value decreases even when the motor speed target value calculated by the motor target calculation unit is smaller than the previous value of the actual value of the rotation speed of the electric motor.

4. The braking control device for the vehicle according to claim 2, wherein the fluid pressure control unit sets the command value to be equal to the motor speed target value on condition that the fluid pressure target value decreases even when the motor speed target value calculated by the motor target calculation unit is smaller than the previous value of the actual value of the rotation speed of the electric motor.

5. A braking control device for a vehicle applied to a braking device of a vehicle including a pump for supplying a brake fluid to a wheel cylinder provided for a vehicle wheel and an electric motor corresponding to a power source of the pump, comprising:

a fluid pressure control unit which controls a fluid pressure inside the wheel cylinder by deriving a motor speed command value corresponding to a command value for a rotation speed of the electric motor every predetermined control cycle and driving the electric motor on the basis of the motor speed command value;

a pump target calculation unit which calculates a pump discharge amount target value corresponding to a target value of a brake fluid discharge amount of the pump every control cycle so that the pump discharge amount target value increases as an increase amount of a fluid pressure target value corresponding to a target value of the fluid pressure inside the wheel cylinder increases;

a difference calculation unit which derives a calculated value that is a value corresponding to a difference obtained by subtracting an actual value of one of the brake fluid discharge amount of the pump and the fluid pressure inside the wheel cylinder from a target value thereof every control cycle; and a pump command value deriving unit which derives a pump discharge amount command value corresponding to a command value for the brake fluid discharge amount of the pump on the basis of the pump discharge amount target value calculated by the pump target calculation unit and the calculated value derived by the difference calculation unit, wherein the fluid pressure control unit derives the motor speed command value so that the motor speed command value increases as the pump discharge amount command value derived by the pump command value deriving unit increases, and when the pump discharge amount target value calculated by the pump target calculation unit is smaller than a previous value of the actual value of the brake fluid discharge amount of the pump, the pump command value deriving unit sets the previous value of the actual value of the brake fluid discharge amount of the pump as an upper-limit of the pump discharge amount command value and derives the pump discharge amount command value so that the pump discharge amount command value increases as the pump discharge amount target value increases and the pump discharge amount command value increases as the calculated value derived by the difference calculation unit increases.

* * * * *